Sept. 10, 1957 D. D. STELLMACHER ET AL 2,806,147
SHUTTERS FOR ATOMIC RADIATION DETECTORS OR THE LIKE
Filed March 30, 1954 2 Sheets-Sheet 1

DONALD D. STELLMACHER
ROBERT C. DANTA
INVENTORS

BY Bruce L. Birchard

THEIR ATTORNEY

Sept. 10, 1957  D. D. STELLMACHER ET AL  2,806,147
SHUTTERS FOR ATOMIC RADIATION DETECTORS OR THE LIKE
Filed March 30, 1954  2 Sheets-Sheet 2

DONALD D. STELLMACHER
ROBERT C. DANTA
INVENTORS

BY

THEIR ATTORNEY

United States Patent Office 2,806,147
Patented Sept. 10, 1957

2,806,147

SHUTTERS FOR ATOMIC RADIATION DETECTORS OR THE LIKE

Donald D. Stellmacher, Los Angeles, and Robert C. Danta, Gardena, Calif., assignors to Hoffman Electronics Corporation, a corporation of California Application March 30, 1954, Serial No. 419,672

5 Claims. (Cl. 250—105)

This invention is related to shields for end-window radiation detectors, and more particularly to an improved shield which may easily expose or cover end-windows of conventional radiation detectors, as desired, and which is also adapted to rugged field use.

In the past, many attempts have been made to design a satisfactory portable atomic radiation detector unit equipped with a shield which may be adjusted to expose or cover the end-window of the particular type detector being used, i. e., a Geiger-Müller tube, scintillation counter, or the like. Shields are useful not only in protecting the detector from physical damage when not in use but are also employed, in the case of a beta-gamma detector employing a Geiger-Müller tube, for example, to determine the amount of beta radiation present by first shielding the tube from low-energy beta radiation to determine the gamma background count, then exposing the tube to both beta and gama radiation by removing the shield to obtain a beta-gama count, in order to arrive at a difference between the beta-gamma count and the gamma background count and thus detect the beta radiation count. Detector covers or shields presently in use appear to be unsatisfactory for one reason or another, and particularly for rugged field use. Principal difficulties are that conventional shields are not easily adjustable to expose and cover variable portions of the detector window; also, most shields are not of rugged construction.

Therefore, it is an object of this invention to provide an improved cover for employment with atomic radiation detectors.

It is a further object of this invention to provide a shutter for atomic radiation detectors which will exhibit maximum ruggedness for field use, and yet provide ease of operation.

It is a still further object of the present invention to provide a shutter for atomic radiation detectors which will insure a maximum exposure of the detector when the shutter is disposed in its most open configuration.

According to this invention, the end of a detector cylindrical housing which exposes the detector end-window is covered by a plurality of interleafing blades associated with a housing sleeve the rotation of which progressively increases or decreases the blade area covering the detector window.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
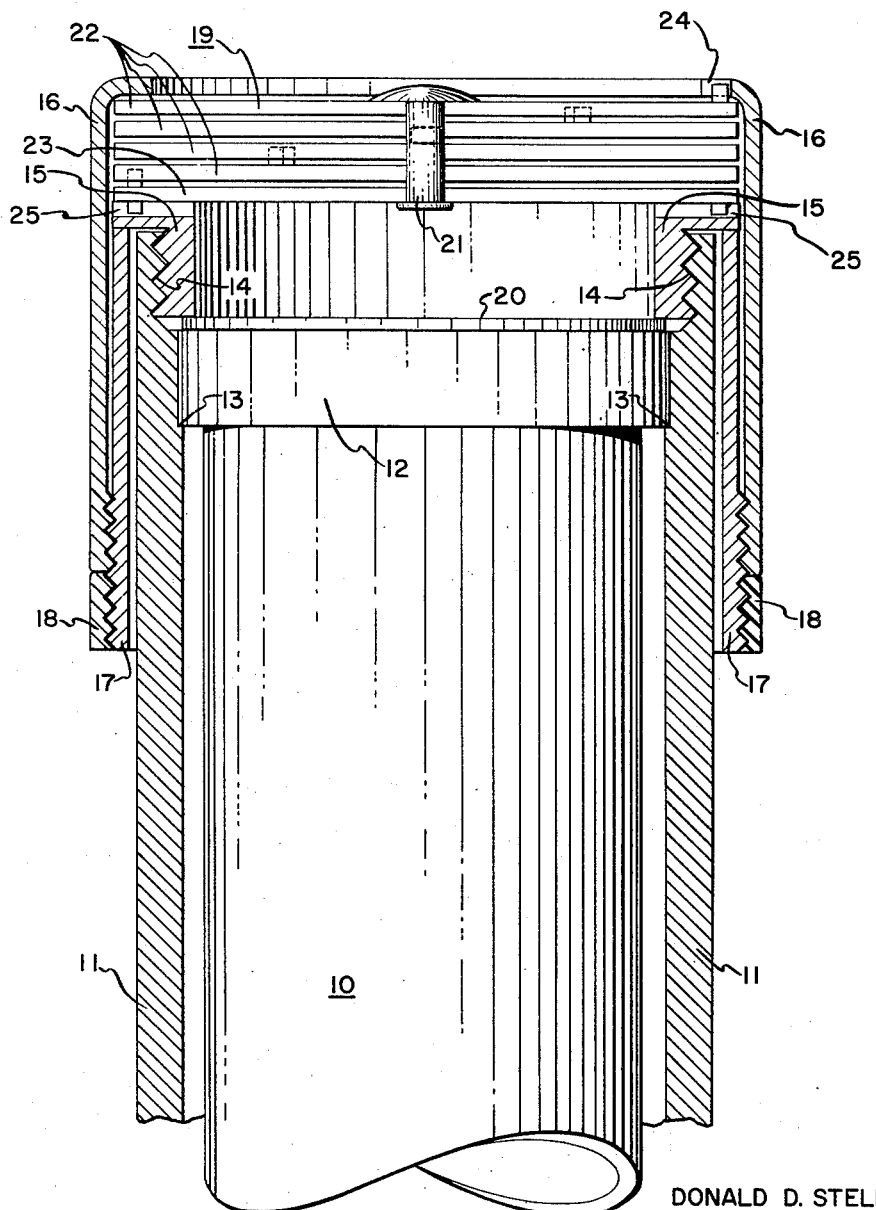
Figure 1 is an elevation view of a detector housing assembly, according to this invention.

In Figure 1, detector tube 10 is positioned within housing 11 so that end-portion 12 of detector 10 fits snugly against shoulder 13 of housing 11. Housing 11 has internally threaded end-portion 14 to receive locknut 15. Collar 16, being locked to sleeve 17 by retaining nut 18, secures blade assembly 19 between itself and washer 20 in a position immediately in front of the end-window of detector 10.

Blade assembly 19 consists of a plurality of blades (shown separated in Figure 1 for clarity) axially joined by rivet 21 so that each blade may rotate freely. The present embodiment of this invention employs four of blades 22 and one of base blades 23.

Figure 2:
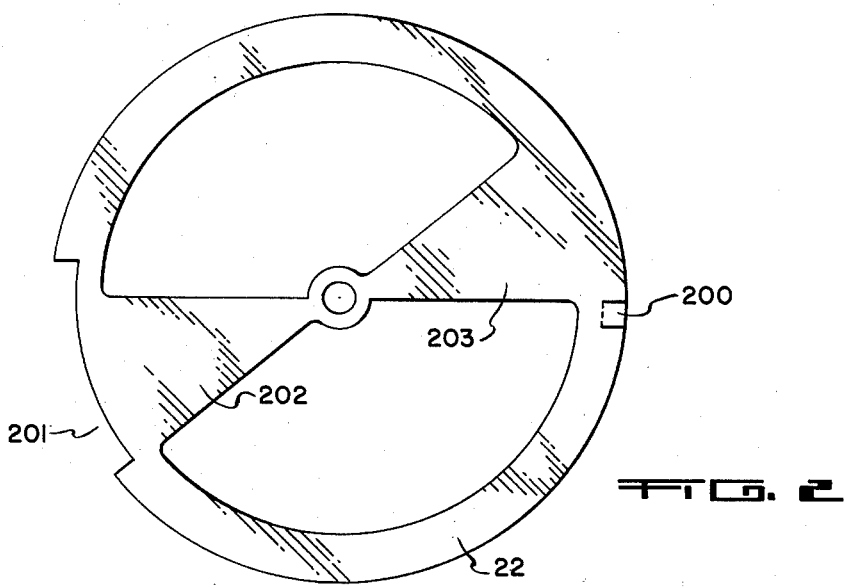
Figure 2 is a flat-pattern layout of one of the four rotating shuter blades, according to this invention.

Figure 2 displays the configuration of each of blades 22, shown as a flat-pattern layout. Tab 200 of the first of blades 22 is bent up to fit into slot 24 of collar 16. Tab 200 of each of the successive blades 22 fit into recessed area 201 of the preceding blade 22.

Figure 3:
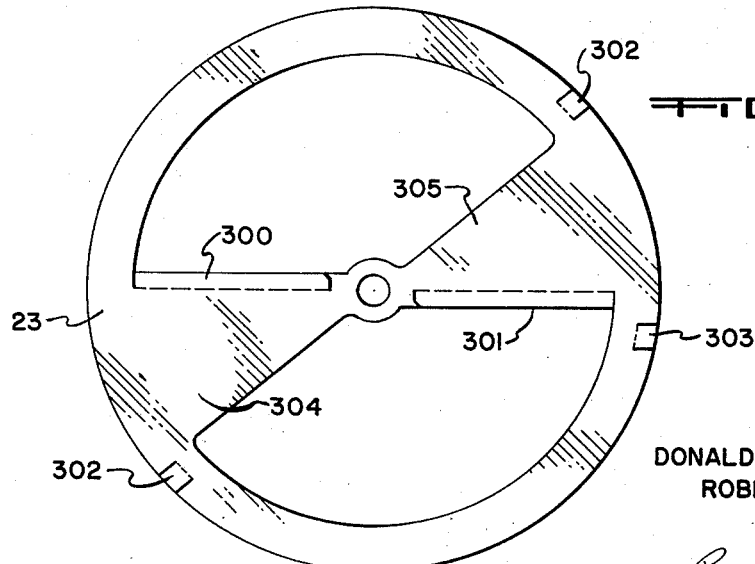
Figure 3 is a flat-pattern layout of the base blade, according to this invention.

Figure 3 displays the configuration of base blade 23, as shown in a flat-pattern layout. Flanges 300 and 301 (not shown in Figure 1 for purposes of clarity) are turned 90° upward to serve as stops for blades 22 in the blade assembly's most open configuration. Tabs 302 are bent down to fit into two notches 25 of locknut 15, and tab 303 is bent up to fit into recessed area 201 of the preceding blade 22 (see Figure 1).

The housing and shutter assembly shown in Figure 1, this shutter assembly having blades as displayed in Figures 2 and 3, operate as follows. In the shutter-open position, portions 202 and 203 of blades 22 will line up with portions 304 and 305 of base blade 23. As collar 16 is rotated counter-clockwise by the operator, blades 22, one by one, progressively unmesh, owing to the movement and subsequent stopping of tab 200 of each blade 22 in recessed area 201 of the preceding blade 22. This operation progresses through successive blades until tab 303 of base blade 23 comes in contact with the edge of recessed area 201 of preceding blade 22, at which time the end-window of the detector will be entirely shielded from its surroundings by blade assembly 19.

Nut 18 securely locks collar 16 to housing sleeve 17. It is seen that blade assembly 19 will remain open or closed, as the operator desires, until collar 16 is turned.

It is to be noted that the shutter concept involved in this invention may be applied to apparatus of the remote probe type just described, or to a unitized detector and indicator, as where the Geiger-Müller tube is packaged with its power supply and indicating apparatus.

It is apparent that this invention provides a new and useful means of shielding atomic radiation detectors having end-windows, this protection being particularly adapted to rugged field operation. Moreover, opening or closing of the proposed shutter is easily accomplished by the operator by merely rotating the housing collar of the detector housing unit. In addition, blade portions 202, 203, 304 and 305 of blades 22 and 23 may be reduced in sector area and the number of blades 22 increased so that when the shutter is in its most open configuration the end-window of the enclosed detector may be exposed almost in its entirety.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A shutter for use with an atomic radiation detector, including a plurality of leaves each having substantially the shape of sectors of a circle, a common axle for said leaves, successive ones of said leaves lying contiguously along said axle, each of said leaves having a slot and a tab extending in a common direction, the tab on each of said leaves being adapted to engage the slot in the next contiguous leaf in said common direction, the last of said plurality of said leaves having an additional tab extending oppositely to said common direction for engagement with a reference member.

2. A shutter for use with an atomic radiation detector, including a plurality of leaves each having substantially the shape of opposite sectors of a circle, a common axle for said leaves, successive ones of said leaves lying contiguously along said axle, each of said leaves having a tab extending in a common direction, the last leaf of said plurality of leaves having at least one additional tab extending oppositely for engagement with a reference member, all leaves of said plurality except said last leaf having a slot to accommodate said tabs of all except the first leaf of said plurality and a rotatable actuating member having a slot for engagement with the tab of said first leaf of said plurality.

3. A portable radiation detector unit including, in combination: a detector tube having an end-window; a cylindrical housing element enclosing said detector tube; a composite shutter disposed in proximity to said housing element immediately adjacent said end-window of said detector tube, said shutter comprising a plurality of leaves rotatable axially about a common center and interlinked so that the rotation of a first leaf will produce progressive rotation of the remaining leaves to expose to radiation desired portions of said end-window of said detector; and means associated with said housing element for securing and adjusting said shutter.

4. A portable radiation detector unit including, in combination: an end-window detector tube; a cylindrical housing element enclosing said detector tube, said housing element having an internal shoulder to accommodate said detector tube, and said housing element also having an internally threaded end-portion immediately adjacent the end-window of said detector tube; a locknut having a collar, and a washer interposed between said locknut and the rim of said end-window of said detector tube, said locknut being adapted to secure said detector tube firmly against said housing shoulder; a sleeve element having an externally threaded end-portion, said sleeve element being positioned over said housing element to abut said locknut collar; a composite shutter disposed immediately adjacent said end-window in a plane substantially parallel thereto, said shutter comprising a plurality of leaves rotatable axially about a common center and interlinked so that the rotation of the first leaf will produce progressive rotation of all of the remaining leaves except the last leaf, to expose to radiation desired portions of said end-window; a collar element having an internally threaded end-portion, said collar element engaging in position said threaded end-portion of said sleeve element to encompass said shutter; a nut retaining said collar element upon said sleeve element; means for securing the outermost blade of said shutter to said collar element; and means for securing the innermost blade of said shutter to said locknut.

5. A portable radiation detector unit including, in combination: an end-window detector tube; a cylindrical housing element enclosing said detector tube, said housing element having an internal shoulder to accommodate said detector tube, and said housing element also having an internally threaded end-portion immediately adjacent the end-window of said detector tube; a locknut having a collar, and a washer interposed between said locknut and the rim of said end-window of said detector tube, said locknut being adapted to secure said detector tube firmly against said housing shoulder; a sleeve element having an externally threaded end-portion, said sleeve element being positioned over said housing element to abut said locknut collar; a composite shutter disposed immediately adjacent said end-window in a plane substantially parallel thereto, said shutter comprising a plurality of leaves rotatable axially about a common center and interlinked so that the rotation of the first leaf will produce progressive rotation of all the remaining leaves except the last leaf, to expose to radiation desired portions of said end-window; a collar element having an internally threaded end-portion, said collar element engaging in position said threaded end-portion of said sleeve element to encompass said shutter; a nut retaining said collar element upon said sleeve element; said collar element being notched to receive a retaining tab of the first leaf of said shutter; and said locknut being notched to receive a plurality of retaining tabs of the last leaf of said shutter.

References Cited in the file of this patent

UNITED STATES PATENTS

| | | |
|---|---|---|
| 2,076,240 | Levy | Apr. 6, 1937 |
| 2,396,998 | Garstang et al. | Mar. 19, 1946 |
| 2,542,440 | Victoreen et al. | Feb. 20, 1951 |
| 2,601,583 | Ballou | June 24, 1952 |

FOREIGN PATENTS

| | | |
|---|---|---|
| 522,956 | France | Apr. 11, 1921 |